(12) United States Patent
Gastineau et al.

(10) Patent No.: US 12,190,358 B2
(45) Date of Patent: Jan. 7, 2025

(54) SYSTEMS AND METHODS FOR AUTOMATICALLY DETERMINING ASSOCIATIONS BETWEEN DAMAGED PARTS AND REPAIR ESTIMATE INFORMATION DURING DAMAGE APPRAISAL

(71) Applicant: Mitchell International, Inc., San Diego, CA (US)

(72) Inventors: Jerry Gastineau, San Diego, CA (US); Niv Genchel, San Diego, CA (US); Julian Louis, San Diego, CA (US); Beau Sullivan, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 1055 days.

(21) Appl. No.: 17/127,575

(22) Filed: Dec. 18, 2020

(65) Prior Publication Data

US 2021/0150591 A1     May 20, 2021

Related U.S. Application Data

(63) Continuation-in-part of application No. 15/421,972, filed on Feb. 1, 2017.
(Continued)

(51) Int. Cl.
*G06Q 40/00* (2023.01)
*G06N 3/04* (2023.01)
(Continued)

(52) U.S. Cl.
CPC ........... *G06Q 30/0278* (2013.01); *G06N 3/04* (2013.01); *G06N 3/08* (2013.01); *G06Q 10/0875* (2013.01); *G06Q 10/20* (2013.01); *G06Q 30/018* (2013.01)

(58) Field of Classification Search
CPC ........... G06Q 30/0278; G06Q 10/0875; G06Q 10/20; G06Q 30/018; G06Q 40/08;
(Continued)

(56) References Cited

U.S. PATENT DOCUMENTS 4,435,769 A    3/1984    Nagano et al.
5,347,656 A    9/1994    Fabritz et al.
(Continued)

FOREIGN PATENT DOCUMENTS

WO    WO2009129496 A2    10/2009

OTHER PUBLICATIONS

Image processing based severity and cost prediction of damages in the vehicle body: A computational intelligence approach; 2017 National Information Technology Conference (NITC) (pp. 18-21); W.A. Rukshala Harshani, Kaneeka Vidanage; Sep. 14, 2017. (Year: 2017).*

(Continued)

*Primary Examiner* — Tien C Nguyen
(74) *Attorney, Agent, or Firm* — Gavrilovich, Dodd & Lindsey LLP

(57) ABSTRACT

A method, non-transitory computer readable medium, and apparatus that improves automated damage appraisal includes analyzing one or more obtained images of property using a deep neural network with multiple hidden layers of units between an input and output and which has stored knowledge data encoded from one or more stored property damage images to identify the part of the vehicle that has sustained damage. Damage data on an extent of the damage in the identified part of the vehicle is determined using the deep neural network which has stored knowledge data encoded from one or more stored property damage images. The identified generic part of the vehicle is used to obtain a corresponding Part ID Code by using a parts dictionary. Part (Continued)

Qualifier information obtained using VIN information is then used in conjunction with the Part ID to obtain the OEM-specific part and then generate one or more repair lines for the repair estimate.

20 Claims, 4 Drawing Sheets

Related U.S. Application Data

(60) Provisional application No. 62/289,720, filed on Feb. 1, 2016.

(51) Int. Cl.
*G06N 3/08* (2023.01)
*G06Q 10/0875* (2023.01)
*G06Q 10/20* (2023.01)
*G06Q 30/018* (2023.01)
*G06Q 30/02* (2023.01)

(58) Field of Classification Search
CPC . G06N 3/04; G06N 3/08; G06N 20/00; G06T 2207/20081; G06T 2207/20084; G06T 2207/30252; G06T 7/001
USPC ............. 705/4, 5, 38, 39, 40, 400, 71; 707/17.014, 706; 701/31.6, 29.3; 713/170; 726/25, 7; 709/225; 715/764; 704/1

See application file for complete search history.

(56) References Cited

U.S. PATENT DOCUMENTS

| | | |
|---|---|---|
| 5,395,664 A | 3/1995 | Thompson, Jr. |
| 5,432,904 A | 7/1995 | Wong |
| 5,504,674 A | 4/1996 | Chen et al. |
| 5,593,225 A | 1/1997 | Safyan |
| 5,809,732 A | 9/1998 | Farmer, Sr. et al. |
| 5,950,169 A | 9/1999 | Borghesi et al. |
| 6,047,858 A | 4/2000 | Romer |
| 6,107,399 A | 8/2000 | Selley et al. |
| 6,207,094 B1 | 3/2001 | Farmer, Sr. et al. |
| 6,381,561 B1 | 4/2002 | Bomar, Jr. et al. |
| 6,467,299 B1 | 10/2002 | Coetzee |
| 6,470,303 B2 | 10/2002 | Kidd et al. |
| 6,885,981 B2 | 4/2005 | Bomar, Jr. et al. |
| 7,197,444 B2 | 3/2007 | Bomar, Jr. et al. |
| 7,222,110 B2 | 5/2007 | Onoue |
| 7,359,821 B1 | 4/2008 | Smith et al. |
| 7,502,772 B2 | 3/2009 | Kidd et al. |
| 7,698,086 B2 | 4/2010 | Kidd et al. |
| 7,716,002 B1 | 5/2010 | Smith |
| 7,789,217 B2 | 9/2010 | Fischer et al. |
| 7,809,587 B2 * | 10/2010 | Dorai ..................... G06Q 10/10 703/8 |
| 7,974,808 B2 | 7/2011 | Smith |
| 8,019,629 B1 | 9/2011 | Medina, III et al. |
| 8,095,391 B2 | 1/2012 | Obora et al. |
| 8,160,904 B1 | 4/2012 | Smith |
| 8,200,513 B2 | 6/2012 | Vahidi et al. |
| 8,260,639 B1 | 9/2012 | Medina, III et al. |
| 8,468,038 B2 | 6/2013 | Vahidi et al. |
| 8,612,170 B2 | 12/2013 | Smith et al. |
| 8,712,806 B1 | 4/2014 | Medina, III et al. |
| 8,725,544 B2 | 5/2014 | Vahidi et al. |
| 8,792,781 B1 | 7/2014 | Randall et al. |
| 9,208,526 B1 * | 12/2015 | Leise ..................... G07C 5/00 |
| 9,218,626 B1 | 12/2015 | Haller, Jr. et al. |
| 9,228,834 B2 | 1/2016 | Kidd et al. |
| 9,500,545 B2 | 11/2016 | Smith et al. |
| 9,721,400 B1 | 8/2017 | Oakes, III et al. |
| 9,846,093 B2 | 12/2017 | Smith et al. |
| 10,339,728 B1 | 7/2019 | Oakes, III et al. |
| 10,360,601 B1 * | 7/2019 | Adegan ............. G06Q 30/0283 |
| 10,410,439 B1 | 10/2019 | Gingrich et al. |
| 10,510,142 B1 | 12/2019 | Dohner et al. |
| 10,796,685 B2 | 10/2020 | Gong et al. |
| 10,922,726 B1 | 2/2021 | Nelson et al. |
| 10,949,814 B1 | 3/2021 | Nelson et al. |
| 2004/0148188 A1 * | 7/2004 | Uegaki ................. G06Q 10/06 705/305 |
| 2005/0246206 A1 | 11/2005 | Obora et al. |
| 2005/0251427 A1 | 11/2005 | Dorai et al. |
| 2006/0064393 A1 | 3/2006 | Orr |
| 2007/0071762 A1 | 3/2007 | Ts'o et al. |
| 2009/0138290 A1 | 5/2009 | Holden |
| 2009/0150200 A1 * | 6/2009 | Siessman ........... G06Q 10/0631 705/7.12 |
| 2009/0265193 A1 | 10/2009 | Collins et al. |
| 2011/0313951 A1 * | 12/2011 | Cook ................. G06Q 30/0283 705/400 |
| 2012/0090956 A1 | 4/2012 | Brobst |
| 2013/0317865 A1 | 11/2013 | Tofte et al. |
| 2014/0025403 A1 | 1/2014 | Vahidi et al. |
| 2014/0058764 A1 | 2/2014 | Vahidi et al. |
| 2014/0067429 A1 | 3/2014 | Lowell |
| 2014/0067637 A1 | 3/2014 | Vahidi et al. |
| 2014/0067735 A1 | 3/2014 | Yu |
| 2014/0074865 A1 * | 3/2014 | Zobrist ................. G06Q 10/06 707/E17.014 |
| 2014/0081675 A1 | 3/2014 | Ives et al. |
| 2014/0095133 A1 | 4/2014 | Silva et al. |
| 2014/0122130 A1 | 5/2014 | Kelly et al. |
| 2014/0229123 A1 | 8/2014 | Smith et al. |
| 2014/0279169 A1 | 9/2014 | Leos |
| 2014/0316825 A1 * | 10/2014 | van Dijk ................. G06Q 40/08 705/4 |
| 2015/0012169 A1 | 1/2015 | Coard |
| 2015/0039397 A1 * | 2/2015 | Fuchs ................. G06Q 30/0283 705/7.35 |
| 2015/0103170 A1 | 4/2015 | Nelson et al. |
| 2015/0106133 A1 | 4/2015 | Smith, Jr. |
| 2015/0213556 A1 | 7/2015 | Haller, Jr. et al. |
| 2015/0294419 A1 * | 10/2015 | Gonzalez Miranda ..................... G06F 3/04842 701/31.6 |
| 2016/0012539 A1 | 1/2016 | Gorelov |
| 2016/0178465 A1 | 6/2016 | Smith et al. |
| 2016/0292759 A1 | 10/2016 | Gonzalez Miranda et al. |
| 2017/0221110 A1 | 8/2017 | Sullivan et al. |
| 2018/0101504 A1 | 4/2018 | Ditomaso |
| 2018/0300576 A1 | 10/2018 | Dalyac et al. |
| 2021/0103817 A1 | 4/2021 | Gastineau et al. |

OTHER PUBLICATIONS

Examination Report in European Patent Application No. 17154277.2. dated Apr. 22, 2021.
Huetter, J., "CCC:A.I. Claims tech could be offered to shops too," http://www.repairerdrivennews.com/2018/12/04/ccc-a-i-claims-tech-could-be-offered-to-shops-too/ (Dec. 4, 2018).
Hellyar, M., "CCC Introduces the World's First Artificial Intelligence Estimating Tool," https://www.cccis.com/2018/12/03/ccc-introduces-the-worlds-first-artificial-intelligence-estimating-tool/ (Dec. 3, 2018).
Novet, "Microsoft Researchers Say Their Newest Deep Learning System Beats Humans—And Google," Feb. 9, 2015, pp. 1-3, BIG-DATA.
He, et al., "Delving Depp Into Rectifiers: Surpassing Human-Level Performance On ImageNet Classification," Feb. 6, 2015, pp. 1-11.
Krizhevsky, Alex et al., "ImageNet Classification with Deep Convolutional Neural Networks," 2012, Advances in Neural Information Processing Systems 25 (NIPS 2012).
Extended European Search Report in EP 17154277.2, dated Jun. 30, 2017.

(56) References Cited

OTHER PUBLICATIONS

Office Action in European Patent Application No. 17154277.2, dated Nov. 19, 2019.

* cited by examiner

SYSTEMS AND METHODS FOR AUTOMATICALLY DETERMINING ASSOCIATIONS BETWEEN DAMAGED PARTS AND REPAIR ESTIMATE INFORMATION DURING DAMAGE APPRAISAL

RELATED APPLICATIONS

This application is a continuation-in-part of U.S. patent application Ser. No. 15/421,972, filed on Feb. 1, 2017, entitled "Methods for Improving Automated Damage Appraisal and Devices Thereof", which claims the benefit of U.S. Provisional Application No. 62/289,720 filed on Feb. 1, 2016, entitled "Methods for Improving Automated Damage Appraisal and Devices Thereof", the contents of which are incorporated herein by reference in their entirety.

The present application is related to U.S. patent application Ser. No. 17/127,518, filed Dec. 18, 2020, entitled "Systems and Methods for Automatically Determining Adjacent Panel Dependencies During Damage Appraisal", the disclosure of which is incorporated herein by reference in its entirety.

TECHNICAL FIELD

This technology generally relates to methods and devices for automated property damage appraisal and devices thereof.

BACKGROUND

Prior software appraisal technologies for automating property damage appraisals which rely on user input and/or predictive analytics to represent damage severity have issues with their ability to consistently provide accurate damage assessments. Estimating is highly subjective and historical estimating data often contains bias and may not represent optimal or accurate information. Subsequently, predictive models which are statistically derived purely from historical data will perpetuate these inaccuracies.

Prior software appraisal technologies for automating property damage appraisals which employ deformation measurement methods of image analysis, such as photogrammetry, require highly specialized and costly instrumentation and technical training to operate. These prior technologies function by comparing specific instances of damaged property to undamaged examples of the same property to calculate the deformation. The requirement to create and maintain a comprehensive catalog of benchmark examples of undamaged property is inefficient and cost prohibitive at scale.

These limitations, inefficiencies, and inconsistencies with these prior software appraisal technologies result in substantial additional costs as well as inconsistencies and errors with automated property damage appraisals.

SUMMARY

In accordance with one or more embodiments, various features and functionality can be provided for automatically determining associations between damaged parts and repair estimate information during a damage appraisal process.

In some embodiments, one or more obtained property images may be analyzed using a deep neural network with multiple hidden layers of units between an input and output, which has stored knowledge data encoded from one or more stored property damage images, to identify the part of the vehicle that has sustained damage. Damage data related to the extent of the damage in the identified part of the vehicle is determined by using the deep neural network which has stored knowledge data encoded from one or more stored property damage images. The identified "generic" part of the vehicle may be used to obtain a Part ID Code, corresponding to the naming convention rules for naming the generic part utilized by one or more automakers also known as Original Equipment Manufacturers ("OEMs"), by using a parts dictionary database. Further, Part Qualifier information may be obtained using VIN information associated with the damaged vehicle. Finally, both the Part ID Code and Part Qualifier Information is used to determine one or more repair lines for restoring the damaged part in accordance with the OEM standards and procedures.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
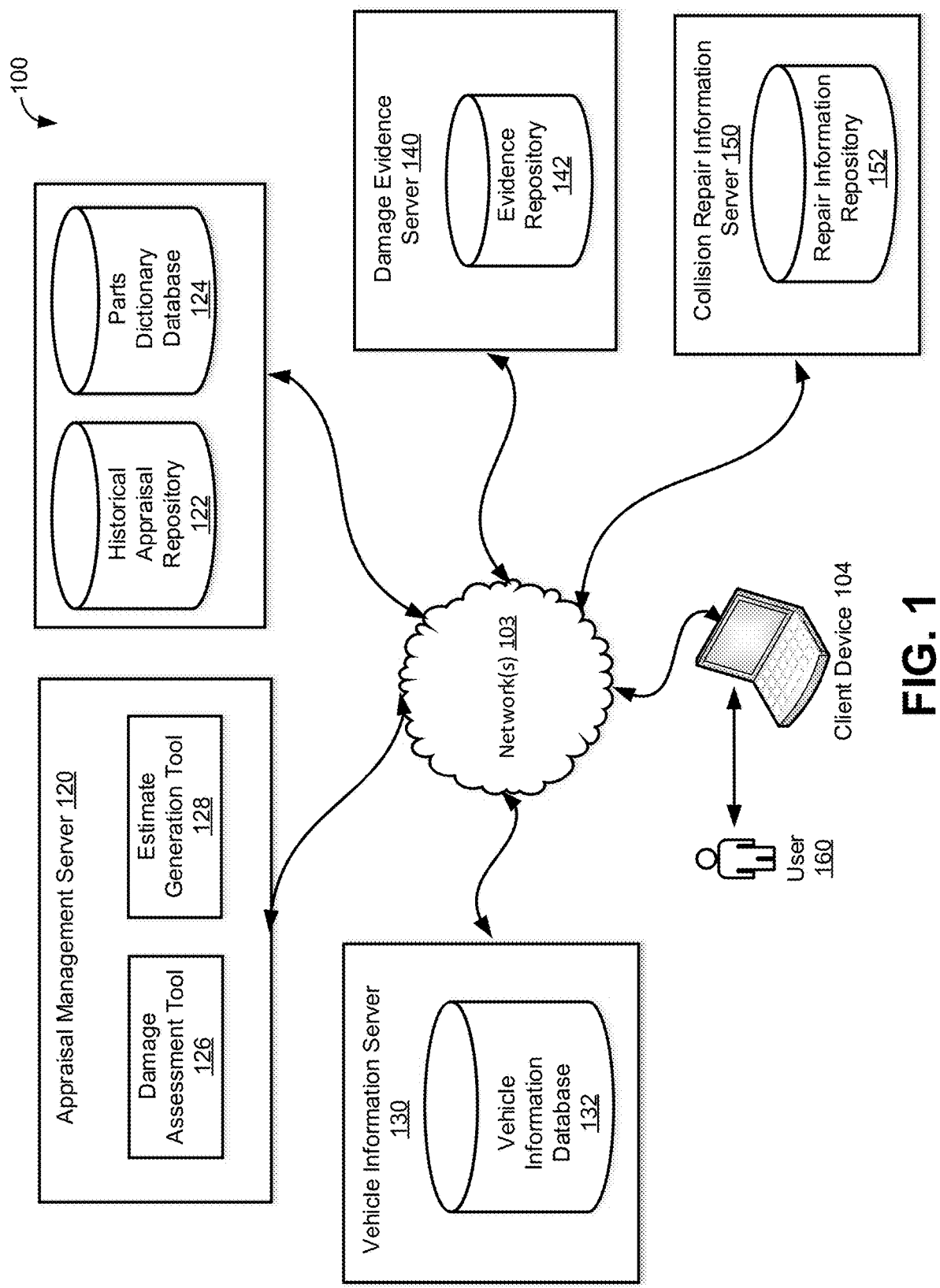
FIG. 1 illustrates example systems and a network environment, according to an implementation of the disclosure.

Described herein are systems and methods for automatically determining associations between generic damaged parts identified by a machine learning or Artificial Intelligence (AI) algorithms and OEM-specific parts for improving the automatic appraisal process. For example, by determining an OEM-specific part associated with a generic damaged part, as identified by AI during the automatic damage appraisal process, the system described herein may determine specific repair estimate (i.e., repair lines) information for incorporating into a repair estimate for restoring a part of a vehicle involved in an adverse event (e.g., a collision accident). The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, existing technology solutions fail to provide a cost-effective method to automatically analyze damage associated with a vehicle. By utilizing machine learning models, algorithms, or AI techniques capable of the functions described herein, the present embodiments may automatically perform damage appraisal by identifying one or more damaged parts and their relationship or association to actual parts of a vehicle.

In some embodiments, the machine learning models may include a deep neural network (DNN), such as an artificial neural network (ANN) with multiple hidden layers of units between the input and output layers. A DNN can perform a number of different operations including by way of example modelling complex non-linear relationships for automated property damage appraisal. For example, the DNN may determine that the damaged part of the vehicle is a front bumper, a right passenger door, or a hood (i.e., generic vehicle parts shared by most vehicles). However, to provide an accurate appraisal it is not sufficient to only identify the damaged part by its generic description (e.g., front bumper, etc.) and the extent to which the part was damaged. That is because each vehicle has unique components that are represented by this generic part description and each automaker (OEM) has their own procedures for handling the repairs. When generating a repair line estimate, it is necessary to identify the specific manufacturer part description, part number, part price and all necessary related labor operations as identified by the repair procedures. Repair procedures are guides to proper methods of repairing the vehicles, and may be published by OEMs, and other aftermarket data suppliers. Notably, each OEM uses its own naming convention rules to uniquely identify specific parts.

Accordingly, when generating an individual repair line during the damage appraisal, it is imperative to utilize information about replacement parts and/or repair operations (i.e., labor operations) that is specific to the damaged vehicle. In some embodiments, a parts dictionary may be used to identify the part in accordance with naming convention utilized by one or more OEMs to determine repair information specific to the damaged part. By virtue of utilizing the parts dictionary, the damage appraisal is thus not dependent on a particular machine learning qualifier designed to identify specific vehicle parts. For example, the DNN used during automatic damage appraisal may be "vehicle agnostic". That is, the DNN may be developed by a third-party and utilized to perform the image analysis to determine generic parts of vehicles.

Environment

FIG. 1 illustrates an example network environment architecture 100 which provides enhanced damage appraisal process, particularly when determining associations between damaged parts and repair estimate information. In some embodiments, environment 100 may include an appraisal management server 120, a vehicle information server 130, a damage evidence server 140, a collision repair information server 150, a client computing device 104, and a network 103. A user 160 (e.g., an appraiser) may be associated with client computing device 104 as described in detail below. Additionally, environment 100 may include other network devices such as one or more routers and/or switches.

Client Computing Device (Image Capture Device)

In some embodiments, client computing device 104 may include a variety of electronic computing devices, for example, a smartphone, a tablet, a laptop, a virtual reality device, an augmented reality device, a display, a mobile phone, a computer wearable device, such as smart glasses, or any other head-mounted display device, or a combination of any two or more of these data processing devices, and/or other devices.

In some embodiments, client computing device 104 may be configured to capture damage evidence, including images and/or videos used in the damage appraisal process. For example, the images may be captured by a user 160 (e.g., an insured/claimant) or by an unmanned aerial vehicle (UAV) configured to capture the images without user input. In some embodiments, client computing device 104 may be configured to generate a three dimensional (3D) scan of the vehicle.

Appraisal Management Server

In some embodiments and as will be described in detail further below, appraisal management server 120 may include a processor, a memory, and network communication capabilities. In some embodiments, appraisal management server 120 may be a hardware server. In some implementations, appraisal management server 120 may be provided in a virtualized environment, e.g., appraisal management server 120 may be a virtual machine that is executed on a hardware server that may include one or more other virtual machines. Additionally, in one or more embodiments of this technology, virtual machine(s) running on appraisal management server 120 may be managed or supervised by a hypervisor. Appraisal management server 120 may be communicatively coupled to a network 103.

In some embodiments, the memory of appraisal management server 120 may store application(s) that can include executable instructions that, when executed by appraisal management server 120, cause appraisal management server 120 to perform actions or other operations as described and illustrated below with reference to FIGS. 2-3. For example, appraisal management server 120 may include a damage assessment tool 124 and an estimate generation tool 126.

Damage Assessment Tool 124

Damage assessment tool 124 may be configured to utilize one or more trained neural network models or other machine learning algorithms and the damage evidence information, including metadata, historical damage appraisal data, and other similar evidence to automatically identify one or more damaged parts and their relationship or association to actual parts of a vehicle. For example, damage assessment tool 124, may use the machine learning algorithm to analyze a plurality of images associated with a damaged vehicle. Further, tool 124 may determine that the front panel of the vehicle is damaged. Finally, tool 124 may identify the front panel as the front bumper of the vehicle. Additionally, damage assessment tool 124 may determine the extent to which the part was damaged, as described in detail below.

In some embodiments, damage assessment tool 124 may be configured to use one or more of a deep learning model, a logistic regression model, a Long Short Term Memory (LSTM) network, supervised or unsupervised model, etc. In some embodiments, repair procedures identification component 108 may utilize a trained machine learning classification model. For example, the machine learning may include decision trees and forests, hidden Markov models, statistical models, cache language model, and/or other models. In some embodiments, the machine learning may be unsupervised, semi-supervised, and/or incorporate deep learning techniques.

Estimate Generation Tool

Estimate generation tool 128 may be configured to utilize one or more trained neural network models or other machine learning algorithms and the damage evidence information, historical damage evidence information, vehicle information, repair information, sensor data, feedback data, and other such data, to obtain repair procedures (i.e., stored repair lines, such as labor operations) for restoring the vehicle part to OEM approved specifications. For example, the damaged part associated with the damaged vehicle may be repaired or replaced.

In some embodiments, damage assessment tool 126 and estimate generation tool 128 may each be implemented using a combination of hardware and software. In some embodiments, damage assessment tool 126 and estimate generation tool 128 may each be a server application, a server module of a client-server application, or a distributed application.

The application(s) can be implemented as modules, engines, or components of other application(s). Further, the application(s) can be implemented as operating system extensions, modules, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application (s), and even the repair management computing device itself, may be located in virtual server(s) running in a cloud-based computing environment rather than being tied to one or more specific physical network computing devices. Also, the application(s) may be running in one or more virtual machines (VMs) executing on the repair management computing device.

In some embodiments, appraisal management server 120 may also include one or more databases. For example, a historic appraisal repository 122 may be configured to store historic records and/or other data related to prior appraisals. Additionally, appraisal management server 120 may also include a parts dictionary database 124 used to identify the damaged Part ID Code which may correspond to a naming convention utilized by one or more OEMs, as alluded to above. The records in parts dictionary database 124 may be organized based on the OEM vehicle year/make/model and/or other categorization model. For example, the record for generic "right fender" part for a Toyota may correspond to a "R FEND" Part ID code. The Part ID Code is then utilized in a look-up search of vehicle specific data to return the necessary information required for a collision damage appraisal from vehicle information server 130.

In other embodiments, appraisal management server 120 may include one or more training databases configured to store training data related to past appraisals used by damage assessment tool 126 and/or estimate generation tool 128 to train the trained neural network module. In yet other embodiments, databases may include one or more database configured to store machine learning data, and/or other information used by appraisal management server 120.

In some embodiments, appraisal management server 120 can be a standalone device or integrated with one or more other devices or apparatuses, such as one or more of the storage devices, for example. For example, appraisal management server 120 may include or be hosted by one of the storage devices, and other arrangements are also possible.

In some embodiments, appraisal management server 120 may transmit and receive information to and from client computing device 104, vehicle information server 130, damage evidenced server 140, collision repair information server 150, and/or other servers via network 103. For example, a communication interface of the appraisal management server 120 may be configured to operatively couple and communicate between client computing device 104, vehicle information server 130, damage evidence server 140, collision repair information server 150, which are all coupled together by the communication network(s) 103.

API

In some embodiments, appraisal management server 120 may include a method for exchanging data between appraisal management server 120 and various systems utilized in the collision repair, billing, and automotive claims processes described herein, including, for example, vehicle information server 130, damage evidence server 140, and collision repair information server 150). In some embodiments, the implementation of the systems and methods described herein may include the publication of a Software Developers Kit (SDK) and/or an Application Programming Interface (API) that will allow for application developers and data providers to implement Interfaces among the various components of the systems. The API data exchange may be accomplished using Standardized Transactions (e.g., CIECA BMS transactions, etc.) or may be by using other published or custom data formats.

For example, API may be integrated with OEM and other third party repair procedure data providers to allow user access to repair procedures via the appraisal management server 120 during the course of repairs, as described herein. This could include both repair procedure data from the vehicle manufacturer (e.g., Toyota, Honda, Ford, G/M, etc.) and third party sources (e.g., I-CAR, ETI, AllData, etc.). This integration of the appraisal management server 120 with the damage evidence and the repair procedures allows the appraisal management server 120 to automatically generate repair estimate lines for a part identified as damaged for a particular vehicle.

As another example, integration may be provided via API with other collision information systems, which may or may not be in use at the collision repair facility, including the repair facility's estimating system and other systems in use by the repair facility for management. In some embodiments, API may be utilized for data exchange with vehicle OEMs, insurers' claims management systems, parts manufacturers and suppliers, and other entities involved in the automotive collision and claims processes.

Vehicle Info Server

In some embodiments, vehicle information server 130 may be configured to store and manage vehicle information associated with a damaged vehicle. For example, vehicle information may include vehicle identification information, such as Vehicle Identification Number (VIN), make, model, and optional modifications (e.g., sub-model and trim level), including installed vehicle components based on the option and trim packages included on the specific vehicle, date and place of manufacture, and similar information related to a damaged vehicle.

The vehicle information server 130 may include any type of computing device that can be used to interface with the appraisal management server 120, damage evidence server 140, collision repair information server 150, and client computing device 104. For example, vehicle information server 130 may include a processor, a memory, and a communication interface, which are coupled together by a bus or other communication link, although other numbers and/or types of network devices could be used. In some embodiments, vehicle information server 130 may also include a database 132. For example, database 132 may include a plurality of databases configured to store content data associated with vehicle information, as indicated above. Vehicle information server 130 may run interface applications, such as standard web browsers or standalone client applications, which may provide an interface to communicate with the repair management computing device via the communication network(s). In some embodiments, vehicle information server 130 may further include a display device, such as a display screen or touchscreen, and/or an input device, such as a keyboard, for example.

Damage Evidence Server

In some embodiments, damage evidence server 140 may be configured to store and manage data related to damage sustained by a vehicle. Damage evidence server 140 may include processor(s), a memory, and a communication interface, which are coupled together by a bus or other communication link, although other numbers and/or types of network devices could be used. In some embodiments, damage evidence server 140 may also include an evidence repository 142. For example, evidence repository 142 may include a plurality of databases configured to store content data associated with damage the vehicle sustained in an adverse event such as collision. Damage evidence data may include images, videos, 3D renderings, scans, holograms, telematics data, audio recordings, and any data identifying vehicle damage. The damaged evidence data may be captured by user 160 operating client computing devices 104 configured as image capture devices, as explained earlier.

In some embodiments, the damage evidence data may include historic data comprising of damage records related to a plurality of adverse events associated with a plurality of vehicles, thereby providing the data related to prior appraisals and repair estimates. For example, a plurality of past estimates that have been authored may be analyzed by identifying estimate lines that may be commonly found together.

In some embodiments, damage evidence server 140 may include any type of computing device that can be used to interface with the appraisal management server 120 to efficiently optimize the collision repair process, as will be described further below. For example, damage evidence server 140 may include a processor, a memory, and a communication interface, which are coupled together by a bus or other communication link, although other numbers and/or types of network devices could be used.

In some embodiments, damage evidence server 140 may run interface applications, such as standard web browsers or standalone client applications, which may provide an interface to communicate with the appraisal management server 120 via the communication network(s) 103. In some embodiments, damage evidence server 140 may further include a display device, such as a display screen or touchscreen, and/or an input device, such as a keyboard, for example.

In some embodiments, the memory of damage evidence server 140 may store application(s) that can include executable instructions that, when executed by damage evidence server 140, cause damage evidence server 140 to perform actions or other operations.

Collision Repair Info Server

In some embodiments, collision repair information server 150 may be configured to store and manage data related to information associated with collision repair. Collision repair information server 150 may include processor(s), a memory, and a communication interface, which are coupled together by a bus or other communication link, although other numbers and/or types of network devices could be used. In some embodiments, collision repair information server 150 may also include a database 152. For example, repair information repository 152 may include a plurality databases configured to store content data associated with repair (e.g., workflow repair procedures, including textual information, images, videos, with and without an audio guide, and/or animations, including 3D animations) demonstrating how to perform repairs of various parts for a variety of different types and models of vehicles. The repair data may include part numbers, wiring diagrams, standard repair times, and other repair procedure information. Additionally, repair information repository 152 may include sensor calibration documentation data, and other similar information. Additionally, database 152 of collision repair information server 150 may include information related to repair standards (e.g., safety standards or manufacturer standards). The content data associated with repair procedures may be encoded and arranged in accordance with a file type specification comprising a particular set of rules, each type of file (text, image, video, audio, and so on) having an associated set of rules. In some embodiment repair information may include repair procedures generated by automakers (OEMs). Alternatively, repair information may include repair procedure information and/or part information generated by a proprietary program or obtained from another third-party source (e.g., insurance carrier).

In some embodiments, collision repair information server 150 may include any type of computing device that can be used to interface with the appraisal management server 120 to efficiently optimize the collision repair process. For example, collision repair information server 150 may include a processor, a memory, and a communication interface, which are coupled together by a bus or other communication link, although other numbers and/or types of network devices could be used.

In some embodiments, collision repair information server 150 may run interface applications, such as standard web browsers or standalone client applications, which may provide an interface to communicate with the appraisal management server 120 via the communication network(s) 103. In some embodiments, collision repair information server 150 may further include a display device, such as a display screen or touchscreen, and/or an input device, such as a keyboard, for example.

In some embodiments, the memory of collision repair information server 150 may store application(s) that can include executable instructions that, when executed by collision repair information server 150, cause collision repair information server 150 to perform actions or other operations.

An example schematic for improving automated damage appraisal will now be described with reference to FIG. 2, although this technology can be used in the same manner for other types of applications, such as using the same process that is illustrated and described by way of the examples herein to review existing property damage estimate repair operation data lists by analyzing the corresponding photos to determine if the repair procedures in the estimate data are optimal and accurately reflect the damage in the photos, thus automating the estimate review process.

Process

Figure 2:
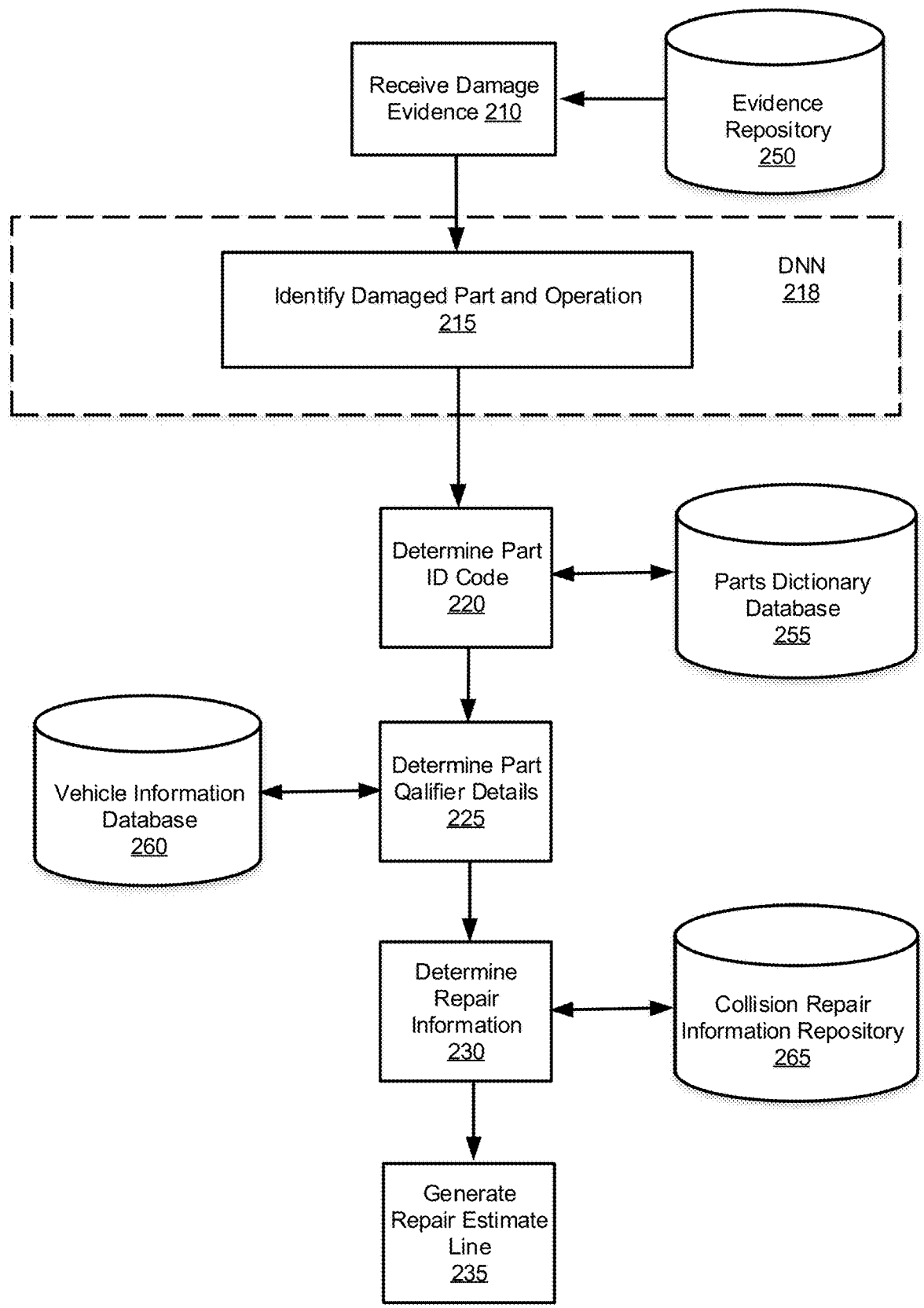
FIG. 2 illustrates an example process for automatically determining associations between damaged parts and repair estimate information, according to an implementation of the disclosure.
Figure 3:
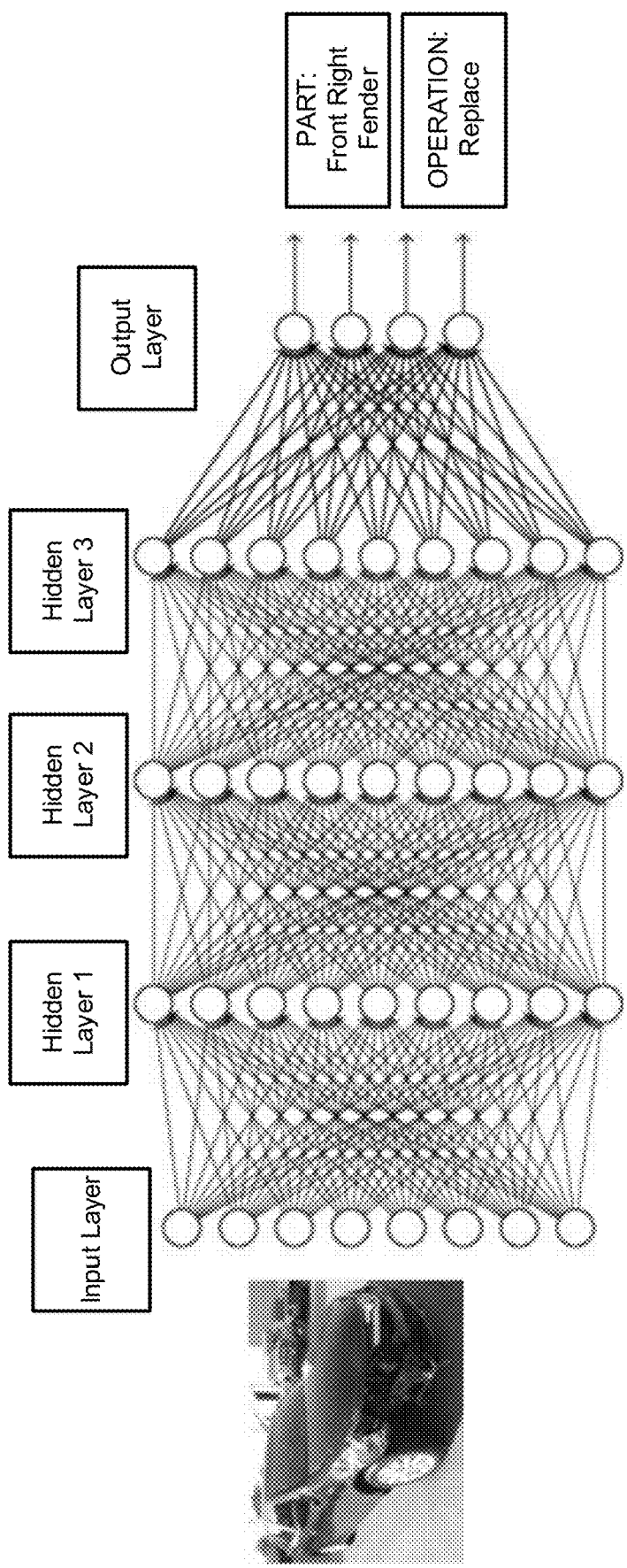
FIG. 3 illustrates a diagram of an example of a deep neural network showing multiple hidden layers illustrating examples of features represented within each of the hidden layers of a deep neural network trained to classify property damage, according to an implementation of the disclosure.

Referring more specifically to FIG. 2, at step 210, evidence data may be received by damage assessment tool (e.g., tool 124 illustrated in FIG. 1) from an evidence repository 250 (e.g., evidence repository 142 illustrated in FIG. 1). As alluded to above, evidence repository 250 may store a plurality of damage evidence including image, videos, 3D scans, and/or similar information related to a damaged vehicle. In some embodiments, individual evidence records (e.g., images) may be captured by a user or and may be requested by appraisal management system 120.

Next in step 215, the damage assessment tool may perform one or more assessments of the one or more damage evidence records when conducting an automated property damage appraisal. In some embodiments, the automated property damage assessment may include identifying one or more damaged part or operation by using DNN 218. As illustrated in FIG. 3, a deep neural network (i.e., DNN 218) may comprise stacked deep neural networks in which many hidden layers between the input and output layer use multiple processing layers composed of multiple linear and/or non-linear transformations for aspects of automated damage appraisal. Additionally, the DNN may have a structure and synaptic weights trained using semi-supervised machine learning techniques in conjunction with labelled and unlabeled data to encode knowledge obtained from earlier damage evidence data, collision repair information and/or other historic data. By virtue of using a DNN results in a significantly more effective and cost efficient automatic damage assessment, than compared with using a simple neural network. In particular, when used by the damage assessment tool (e.g., damage assessment tool 124 illustrated in FIG. 1), DNN 218 identifies damaged part and operations that need to be performed to restore the damage. Other artificial intelligence techniques may be used instead of, or in addition to, using a machine learning model. By virtue of utilizing a machine learning approach enhances the automated mapping process described herein.

First, the DNN may determine when the images are relevant to the identified damaged property based on analyzed classifications and confidences of the one or more obtained images when compared to correlated stored images for the same type of property that are above one or more configured and stored thresholds, although other manners for qualifying the one or more images and other types of automated damage analysis may be executed at the same time or separately. Any of the one or more analyzed images that are not of the correct vehicle for damage appraisal are not qualified and may be ignored by the subsequent automated damage appraisal process executed by the appraisal management server (e.g., appraisal management server 120 illustrated in FIG. 1).

Next, DNN may analyze each of the one or more qualified images to identify the one or more areas of the property being assessed for the appraisal. For example, DNN 218 may determine that the one or more qualified images are of the Front Right Fender of the damaged vehicle.

Finally, DNN 218 may analyze to determine if any of the identified images depict any damage and the extent of the damage, although other manners for determining if any of the one or more images depict any damage and the extent of the damage and other types of automated damage analysis may be executed at the same time or separately. For example, DNN 218 may analyze each of the qualified images to identify damage and determine the extent of the damage based on assessed classifications and confidences in the identified images when compared to correlated stored images for the same type of property that are above one or more corresponding configured stored thresholds. Further still, DNN 218 may determine and output one or more operations required to be performed to restore the damaged part.

Parts Dictionary

Referring back to FIG. 2, in step 220, the damage assessment tool may obtain the output of DNN 218, as explained above, to determine the Part ID Code of a part which may correspond to a naming convention utilized by one or more OEMs by using a parts dictionary database 255 (e.g., parts dictionary database 124 illustrated in FIG. 1). For example, if the output generated by DNN 218 is "Right Front Fender", then the Part ID Code may be determined to be "R FEND".

In step 225, the damage assessment tool may obtain other data relating to the property to be appraised for damage, such as a vehicle identification number (VIN) may be obtained in connection with the damaged vehicle. For example, VIN may be obtained using vehicle information database 260 (vehicle information database 132 illustrated in FIG. 1). VIN may be used obtain additional details related to the damaged part determined by DNN 218.

A VIN is the identifying code of seventeen alphanumeric characters assigned to an individual vehicle at the time of its manufacture. Each VIN number is unique, as no two vehicles in operation have the same VIN number. A VIN may reveal certain information about a vehicle, including engine size, model year and trim level. For example, the first characters may indicate where the vehicle was built, the second and third characters denote the manufacturer, the second, third, and eighth characters may identify a flexible fuel vehicle, the fourth and eighth characters indicate the make, model, engine size and type of the vehicle, the ninth character includes a security code that identifies the VIN as being authorized by the manufacturer, the tenth character indicates the model year of the vehicle, the eleventh character indicates the plant where the vehicle was assembled, and the last six characters provide a unique serial number of the vehicle. Extracting certain data from the VIN may further help you identify the exact configuration of the vehicle. In particular, additional data may include Part Qualifier information providing details of various assemblies and components. For example, Part Qualifier related to the RIGHT FENDER may be "w/ Wheel Flares" or "w/o Wheel Flares" indicating absence or presence of wheel flares.

That is because the VIN may include information related to the model or the sub-model level which may be useful in identifying Part Qualifier information, as many vehicle manufacturers use particular parts for particular sub-models. By virtue of using Part Qualifier results in a more accurate identification of the part than just using the part description alone. For example, many parts may have the same functional description but will be identified using a different Part ID code across different models or sub-models. Accordingly, by leveraging various combinations of VIN configurations allows the system to identify multiple vehicle attributes, which in turn results in making it possible to identify an actual Part ID code specific for the model or sub-model. For example, a particular sub-model may have a certain engine configuration and thus a unique cooling system as differentiated from another engine configuration. It is thus possible to know which radiator (i.e., a part of the cooling system) applies to a sub-model based on the known engine configuration derived from the VIN.

In some embodiments, one Part ID Code may have multiple parts matching the same generic description. To determine which Part ID Code is the correct one, Part Qualifier which is derived from the VIN may be used, as alluded to above. For example, Part Qualifier may be matched to a part in the list of multiple parts matching the Part ID Code and thus can be combined with the Part ID Code as a method to filter and select the unique correct part.

In step 230, the Part ID Code along with Part Qualifier may be used to determine one or more of a plurality of OEM-specific parts and/or one or more of a plurality of stored repair lines, such as labor operations for the repair or replacement of the damaged part, based on the operation output of DNN 218. For example, the one or more repair lines may be obtained using collision repair information repository 265 (collision repair information repository 152 illustrated in FIG. 1). Unlike prior software appraisal technologies for automating property damage appraisals, utilizing the parts dictionary allows the system to obtain part references that can be then be used to determine OEM-specific part numbers and repair procedure information without using specialized and costly instrumentation and technical training to operate as well as the creation and maintenance of a comprehensive catalog of mapping of the plurality of repair procedure templates and related data.

In step 235, an estimate generator tool (e.g., estimate generator tool 128 illustrated in FIG. 1) may generate estimate repair lines based on initial automated appraisal data which may include the identity of the part, the extent of the damage sustained by the part based on the analysis by the deep neural network, and generated repair lines. In some embodiments, the estimate generator tool may perform further calculations using one of a plurality of stored customer profile settings to further refine the updated list of one or more parts and/or one or more repair lines based on one or more customer requirements and/or preferences, although other types of refining calculations may be applied.

System Architecture

In some embodiments, appraisal management server 120, vehicle information server 130, damage evidence server 140, and collision repair information server 150 may be a single device. Alternatively, in some embodiments, vehicle information server 130, repair information servers 140, and collision repair information server 150 may include a plurality of devices. For example, the plurality of devices associated with appraisal management server 120, vehicle information server 130, damage evidence server 140, and collision repair information server 150 may be distributed across one or more distinct network computing devices that together comprise one or more appraisal management server 120, vehicle information server 130, damage evidence server 140, and collision repair information server 150.

In some embodiments, appraisal management server 120, vehicle information server 130, damage evidence server 140, and collision repair information server 150 may not be limited to a particular configuration. Thus, in some embodiments, appraisal management server 120, vehicle information server 130, damage evidence server 140, and collision repair information server 150 may contain a plurality of network devices that operate using a master/slave approach, whereby one of the network devices operate to manage and/or otherwise coordinate operations of the other network devices. Additionally, in some embodiments, appraisal management server 120, vehicle information server 130, damage evidence server 140, and collision repair information server 150 may comprise different types of data at different locations.

In some embodiments, appraisal management server 120, vehicle information server 130, damage evidence server 140, and collision repair information server 150 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary network environment 100 with client computing device 104, appraisal management server 120, vehicle information server 130, damage evidence server 140, collision repair information server 150, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as client computing device 104, appraisal management server 120, vehicle information server 130, damage evidence server 140, and/or collision repair information server 150 may be configured to operate as virtual instances on the same physical machine. In other words, one or more of client computing device tool 104, appraisal management server 120, damage evidence server 140, and/or collision repair information server 150, may operate on the same physical device rather than as separate devices communicating through communication network(s). Additionally, there may be more or fewer devices than client computing device 104, appraisal management server 120, vehicle information server 130, damage evidence server 140, and/or collision repair information server 150.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

Figure 4:
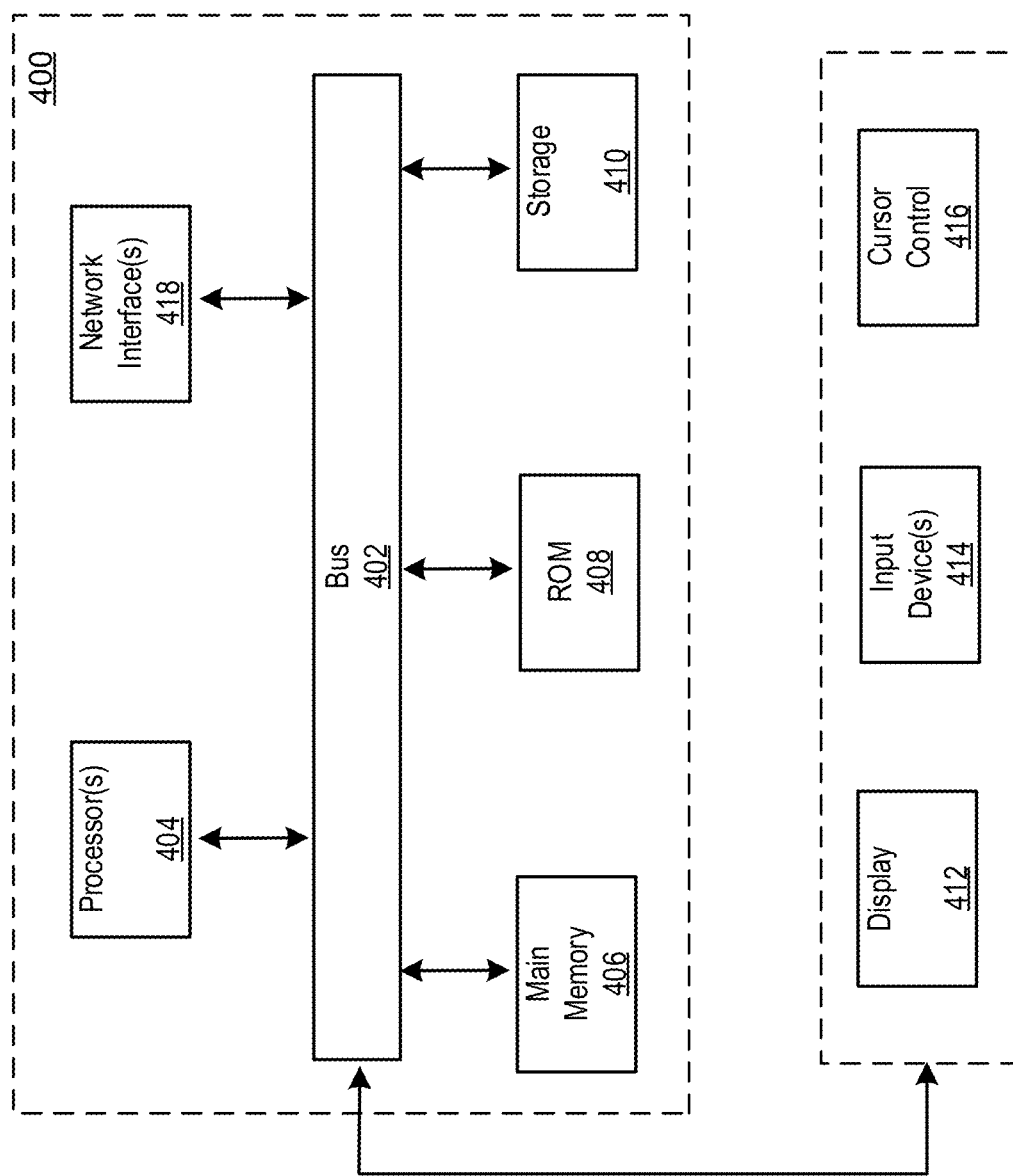
FIG. 4 illustrates an example computing system that may be used in implementing various features of embodiments of the disclosed technology.

Standard System

Where circuits are implemented in whole or in part using software, in one embodiment, these software elements can be implemented to operate with a computing or processing system capable of carrying out the functionality described with respect thereto. One such example computing system is shown in FIG. 4. Various embodiments are described in terms of this example-computing system 400. After reading this description, it will become apparent to a person skilled in the relevant art how to implement the technology using other computing systems or architectures.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a transparent heads-up display (HUD) or an optical head-mounted display (OHMD), for displaying information to a computer user. An input device 414, including a microphone, is coupled to bus 402 for communicating information and command selections to processor 404. An output device 416, including a speaker, is coupled to bus 402 for communicating instructions and messages to processor 404.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 405. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 405. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 402. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for conducting an automatic appraisal of a vehicle damaged during an adverse incident, the system comprising:
    a user computing device; and
    an appraisal management computing apparatus comprising:
    a processor; and
    a memory storing computer-executable instructions that, when executed by the processor, cause the appraisal management computing apparatus to:
    provide at least one damage evidence file for a damaged part of the vehicle as input to a deep neural network (DNN), wherein responsive to the input, the DNN generates output comprising a part code corresponding to the damaged part, wherein the DNN comprises multiple layers including an input layer, an output layer, and one or more hidden layers between the input layer and the output layer, and wherein the DNN is trained on historic damage data comprising a plurality of damage evidence files associated with corresponding damaged parts previously identified as damaged;
    identify an Original Equipment Manufacturer (OEM) part number based on the part code and a vehicle identification number (VIN) associated with the vehicle; and
    generate a repair estimate line comprising the OEM part number.

2. The system of claim 1, wherein the output of the DNN comprises a repair operation for restoring the damaged part.

3. The system of claim 2, wherein the repair estimate line comprises an OEM repair operation determined based on the repair operation identified by the output of the DNN.

4. The system of claim 3, wherein the repair estimate line is incorporated into an automatic appraisal of damage to restoring the vehicle damaged during the adverse incident.

5. The system of claim 1, wherein identifying the OEM part number comprises extracting data from the VIN.

6. The system of claim 1, wherein identifying the OEM part number comprises using a parts dictionary configured to store associations between generic vehicle parts and OEM part numbers.

7. The system of claim 1, wherein the at least one damage evidence file comprises at least an image file, a video file, a 3D scan file.

8. The system of claim 1, wherein OEM part code and OEM repair operation are specific to individual automotive manufacturers.

9. A method for conducting an automatic appraisal of a vehicle damaged during an adverse incident, the method comprising:
    providing, by a damage assessment computing apparatus, at least one damage evidence file for a damaged part of the vehicle as input to a deep neural network (DNN), wherein responsive to the input, the DNN generates output comprising a part code corresponding to the damaged part, wherein the DNN comprises multiple layers including an input layer, an output layer, and one or more hidden layers between the input layer and the output layer, and wherein the DNN is trained on historic damage data comprising a plurality of damage evidence files associated with corresponding damaged parts previously identified as damaged;
    identifying, by the damage assessment computing apparatus, an Original Equipment Manufacturer (OEM) part number based on the part code and a vehicle identification number (VIN) associated with the vehicle; and
    generating, by a repair estimate generating computing apparatus, a repair estimate line comprising the OEM part number.

10. The method of claim 9, wherein the output of the DNN comprises a repair operation for restoring the damaged part.

11. The method of claim 10, wherein the repair estimate line comprises an OEM repair operation determined based on the repair operation identified by the output of the DNN.

12. The method of claim 11, wherein the repair estimate line is incorporated into an automatic appraisal of damage to restoring the vehicle damaged during the adverse incident.

13. The method of claim 9, wherein identifying the OEM part number comprises extracting data from the VIN.

14. The method of claim 9, wherein identifying the OEM part number comprises using a parts dictionary configured to store associations between generic vehicle parts and OEM part numbers.

15. The method of claim 9, wherein responsive to a user selection of an individual evidence file associated with a damaged part, presenting one more vehicle parts determined to be related.

16. The method of claim 9, wherein the at least one damage evidence file comprises at least an image file, a video file, a 3D scan file.

17. The method of claim 9, wherein OEM part code and OEM repair operation are specific to individual automotive manufacturers.

18. One or more non-transitory machine-readable storage media encoded with instructions that, when executed by one or more hardware processors of a computing system, cause the computing system to perform operations for conducting an automatic appraisal of a vehicle damaged during an adverse incident, the operations comprising:
    providing, by a damage assessment computing apparatus, at least one damage evidence file depicting a damaged part of the vehicle as input to a deep neural network (DNN), wherein responsive to the input, the DNN generates output comprising a part code corresponding to the damaged part, wherein the DNN comprises multiple layers including an input layer, an output layer, and one or more hidden layers between the input layer and the output layer, and wherein the DNN is trained on historic damage data comprising a plurality of damage evidence files associated with corresponding damaged parts previously identified as damaged;
    identifying, by the damage assessment computing apparatus, an Original Equipment Manufacturer (OEM) part number based on the part code and a vehicle identification number (VIN) associated with the vehicle; and
    generating, by a repair estimate generating computing apparatus, a repair estimate line comprising the OEM part number.

19. The one or more non-transitory machine-readable storage media of claim 18, wherein the output of the DNN comprises a repair operation for restoring the damaged part.

20. The one or more non-transitory machine-readable storage media of claim 19, wherein the repair estimate line comprises an OEM repair operation determined based on the repair operation identified by the output of the DNN.

* * * * *